(12) United States Patent
Andreou et al.

(10) Patent No.: US 11,671,664 B2
(45) Date of Patent: *Jun. 6, 2023

(54) MEDIA COLLECTION GENERATION AND PRIVACY MECHANISMS

(71) Applicant: Snap Inc., Santa Monica, CA (US)

(72) Inventors: Jacob Andreou, Santa Monica, CA (US); Sheldon Chang, Venice, CA (US); Donald Giovannini, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,611

(22) Filed: Nov. 22, 2021

(65) Prior Publication Data

US 2022/0086526 A1    Mar. 17, 2022

Related U.S. Application Data

(63) Continuation of application No. 16/146,336, filed on Sep. 28, 2018, now Pat. No. 11,202,124.

(Continued)

(51) Int. Cl.
*H04N 7/16*          (2011.01)
*H04N 21/4545*    (2011.01)
(Continued)

(52) U.S. Cl.
CPC ......... *H04N 21/4545* (2013.01); *G06Q 50/01* (2013.01); *H04N 21/2396* (2013.01);
(Continued)

(58) Field of Classification Search
CPC .......... H04N 21/4545; H04N 21/2396; H04N 21/25841; H04N 21/25883;
(Continued)

(56) References Cited

U.S. PATENT DOCUMENTS 9,514,331 B2    12/2016  Kanter et al.
9,645,702 B2     5/2017  Schoen et al.
(Continued)

FOREIGN PATENT DOCUMENTS

CN      111406411       7/2020
KR     20140066272      6/2014
(Continued)

OTHER PUBLICATIONS

U.S. Appl. No. 16/146,336 U.S. Pat. No. 11,202,124, filed Sep. 28, 2018, Media Collection Generation and Privacy Mechanisms.
(Continued)

*Primary Examiner* — Mulugeta Mengesha
(74) *Attorney, Agent, or Firm* — Schwegman Lundberg & Woessner, P.A.

(57) ABSTRACT

Systems and methods described herein relate to generation of media collections in a messaging system. The media collection may be created by the user, other users, or an entity. Example embodiments further allow users to set access criteria through privacy settings assigned to one or more media content items themselves, as well as to a media collection, such that some or all of the media collection may only be viewed by users authorized by the user sharing the media content item or media collection (e.g., only to one or more users designated by the user as a "friend").

17 Claims, 11 Drawing Sheets

Related U.S. Application Data

(60) Provisional application No. 62/591,441, filed on Nov. 28, 2017.

(51) Int. Cl.

| | | |
|---|---|---|
| *H04N 21/435* | (2011.01) | |
| *H04N 21/45* | (2011.01) | |
| *G06Q 50/00* | (2012.01) | |
| *H04N 21/258* | (2011.01) | |
| *H04N 21/239* | (2011.01) | |
| *H04N 21/2743* | (2011.01) | |

(52) U.S. Cl.
CPC . *H04N 21/25841* (2013.01); *H04N 21/25883* (2013.01); *H04N 21/2743* (2013.01); *H04N 21/435* (2013.01); *H04N 21/4532* (2013.01)

(58) Field of Classification Search
CPC ............. H04N 21/2743; H04N 21/435; H04N 21/4532; G06Q 50/01
See application file for complete search history.

(56) References Cited

U.S. PATENT DOCUMENTS

| | | | |
|---|---|---|---|
| 11,202,124 | B2 | 12/2021 | Andreou et al. |
| 2005/0086606 | A1 | 4/2005 | Blennerhassett et al. |
| 2010/0125603 | A1 | 5/2010 | Lehikoinen et al. |
| 2011/0246572 | A1 | 10/2011 | Kollenkark et al. |
| 2012/0216296 | A1 | 8/2012 | Kidron |
| 2012/0222133 | A1 | 8/2012 | Kidron |
| 2013/0091461 | A1 | 4/2013 | Sgro et al. |
| 2013/0117365 | A1 | 5/2013 | Padmanabhan et al. |
| 2014/0067961 | A1 | 3/2014 | Archibong et al. |
| 2014/0223099 | A1 | 8/2014 | Kidron |
| 2014/0280058 | A1* | 9/2014 | St. Clair ............. G06F 16/9535 707/722 |
| 2014/0324967 | A1 | 10/2014 | Atias et al. |
| 2014/0363137 | A1 | 12/2014 | Kuhne et al. |
| 2015/0013016 | A1* | 1/2015 | Kanter ................ G06F 21/6245 726/28 |
| 2016/0162513 | A1 | 6/2016 | Madjar et al. |
| 2016/0165002 | A1 | 6/2016 | Lebeau et al. |
| 2016/0173625 | A1 | 6/2016 | Ruben et al. |
| 2017/0255698 | A1 | 9/2017 | Zhang et al. |
| 2018/0032212 | A1* | 2/2018 | Choi ................... G06F 3/04842 |
| 2019/0166400 | A1 | 5/2019 | Andreou et al. |

FOREIGN PATENT DOCUMENTS

| | | |
|---|---|---|
| KR | 20140113336 | 9/2014 |
| KR | 102427296 B1 | 8/2022 |
| WO | 2019108666 | 6/2019 |

OTHER PUBLICATIONS

"Korean Application Serial No. 10-2020-7015801, Response filed Apr. 11, 2022 toNotice of Preliminary Rejection dated Jan. 11, 2022", w English Claims, 23 pgs.
"International Application Serial No. PCT US2018 062867, International Search Report dated Mar. 18, 2019", 5 pgs.
"International Application Serial No. PCT US2018 062867, Written Opinion dated Mar. 18, 2019", 5 pgs.
"U.S. Appl. No. 16/146,336, Non Final Office Action dated Jan. 10, 2020", 9 pgs.
"Surprise!", [Online] Retrieved from the Internet: URL: https: www.snap.com en-US news post surprise, (Oct. 3, 2013), 1 pg.
"U.S. Appl. No. 16/146,336, Response filed Apr. 10, 2020 to Non Final Office Action dated Jan. 10, 2020", 11 pgs.
"U.S. Appl. No. 16/146,336, Final Office Action dated Jun. 5, 2020", 10 pgs.
"International Application Serial No. PCT US2018 062867, International Preliminary Report on Patentability dated Jun. 11, 2020", 7 pgs.
"U.S. Appl. No. 16/146,336, Response filed Jun. 22, 2020 to Final Office Action dated Jun. 5, 2020", 11 pgs.
"U.S. Appl. No. 16/146,336, Non Final Office Action dated Aug. 13, 2020", 10 pgs.
"U.S. Appl. No. 16/146,336, Response filed Aug. 18, 2020 to Non Final Office Action dated Aug. 13, 2020", 11 pgs.
"U.S. Appl. No. 16/146,336, Final Office Action dated Sep. 14, 2020", 13 pgs.
"U.S. Appl. No. 16/146,336, Response filed Nov. 16, 2020 to Final Office Action dated Sep. 14, 2020", 11 pgs.
"U.S. Appl. No. 16/146,336, Non Final Office Action dated Mar. 11, 2021", 13 pgs.
"U.S. Appl. No. 16/146,336, Response filed Apr. 29, 2021 to Non Final Office Action dated Mar. 11, 2021", 12 pgs.
"U.S. Appl. 16/146,336, Final Office Action dated Jun. 28, 2021", 13 pgs.
"U.S. Appl. No. 16/146,336, Response filed Jul. 6, 2021 to Final Office Action dated Jun. 28, 2021", 10 pgs.
"U.S. Appl. No. 16/146,336, Notice of Allowance dated Aug. 6, 2021", 10 pgs.
"Chinese Application Serial No. 201880076858.2, Office Action dated Jul. 5, 2021", w English translation, 14 pgs.
"Korean Application Serial No. 10-2020-7015801, Notice of Preliminary Rejection dated Jan. 11, 2022", w English Translation, 9 pgs.
"Chinese Application Serial No. 201880076858.2, Office Action dated Jan. 29, 2022", w English Translation, 9 pgs.
Buscemi, Scott, "Snapchat introduces 'Stories', a narrative built with snaps", [Online] Retrieved from the Internet: URL: https: 9to5mac.com 2013 10 03 snapchat-introduces-stories-a-narrative-built-with-snaps , (Oct. 3, 2013), 2 pgs.
Etherington, Darrell, "Snapchat Gets Its Own Timeline With Snapchat Stories, 24-Hour Photo and Video Tales", [Online] Retrieved from the Internet: URL: https: techcrunch.com 2013 10 03 snapchat-gets-its-own-timeline-with-snapchat-stories-24-hour-photo-video-tales , (Oct. 3, 2013), 2 pgs.
Fangfang, Shan, "Access Control Mechanism for Multidimensional Digital Media", Journal on Communications, 36 (11), (Nov. 2015), 5 pgs.
Hamburger, Ellis, "Snapchat's next big thing: 'Stories' that don't just disappear", [Online] Retrieved from the Internet: URL: https: www.theverge.com 2013 10 3 4791934 snapchats-next-big-thing-stories-that-dont-just-disappear. (Oct. 3, 2013), 5 pgs.
"Chinese Application Serial No. 201880076858.2, Decision of Rejection dated Jul. 7, 2022", W/English Translation, 11 pgs.

* cited by examiner

800 

CAUSING DISPLAY OF A PLURALITY OF PRIVACY OPTIONS AT THE CLIENT DEVICE IN RESPONSE TO THE RECEIVING THE INDICATION TO INCLUDE THE MEDIA CONTENT ITEM IN THE MEDIA COLLECTION ASSOCIATED WITH THE USER PROFILE
802

RECEIVING A SELECTION OF THE PRIVACY OPTION FROM AMONG THE PLURALITY OF PRIVACY OPTIONS
804

ASSIGNING THE PRIVACY OPTION TO THE MEDIA CONTENT ITEM IN RESPONSE TO THE RECEIVING THE SELECTION OF THE PRIVACY OPTION
806

FIG. 8

900
RECEIVING A REQUEST TO DISPLAY THE MEDIA COLLECTION FROM A SECOND CLIENT DEVICE, THE REQUEST COMPRISING A REQUEST ATTRIBUTE
902
FILTERING THE MEDIA CONTENT ITEM FROM THE MEDIA COLLECTION BASED ON THE REQUEST ATTRIBUTE AND THE ACCESS CRITERIA OF THE PRIVACY OPTION
904
PRESENTING THE FILTERED MEDIA COLLECTION AT THE SECOND CLIENT DEVICE
906
*FIG. 9*

MEDIA COLLECTION GENERATION AND PRIVACY MECHANISMS

PRIORITY

This application is a continuation of U.S. application Ser. No. 16/146,336, filed Sep. 28, 2018, which application claims the benefit of priority of U.S. Provisional Application Ser. No. 62/591,441, filed on Nov. 28, 2017, which is hereby incorporated by reference herein in its entirety

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

FIG. 8 is a flowchart illustrating a method for assigning privacy options to a media content item, according to certain example embodiments.

FIG. 9 is a flowchart illustrating a method for assigning privacy options to a media content item, according to certain example embodiments.

DETAILED DESCRIPTION

Figure 1:
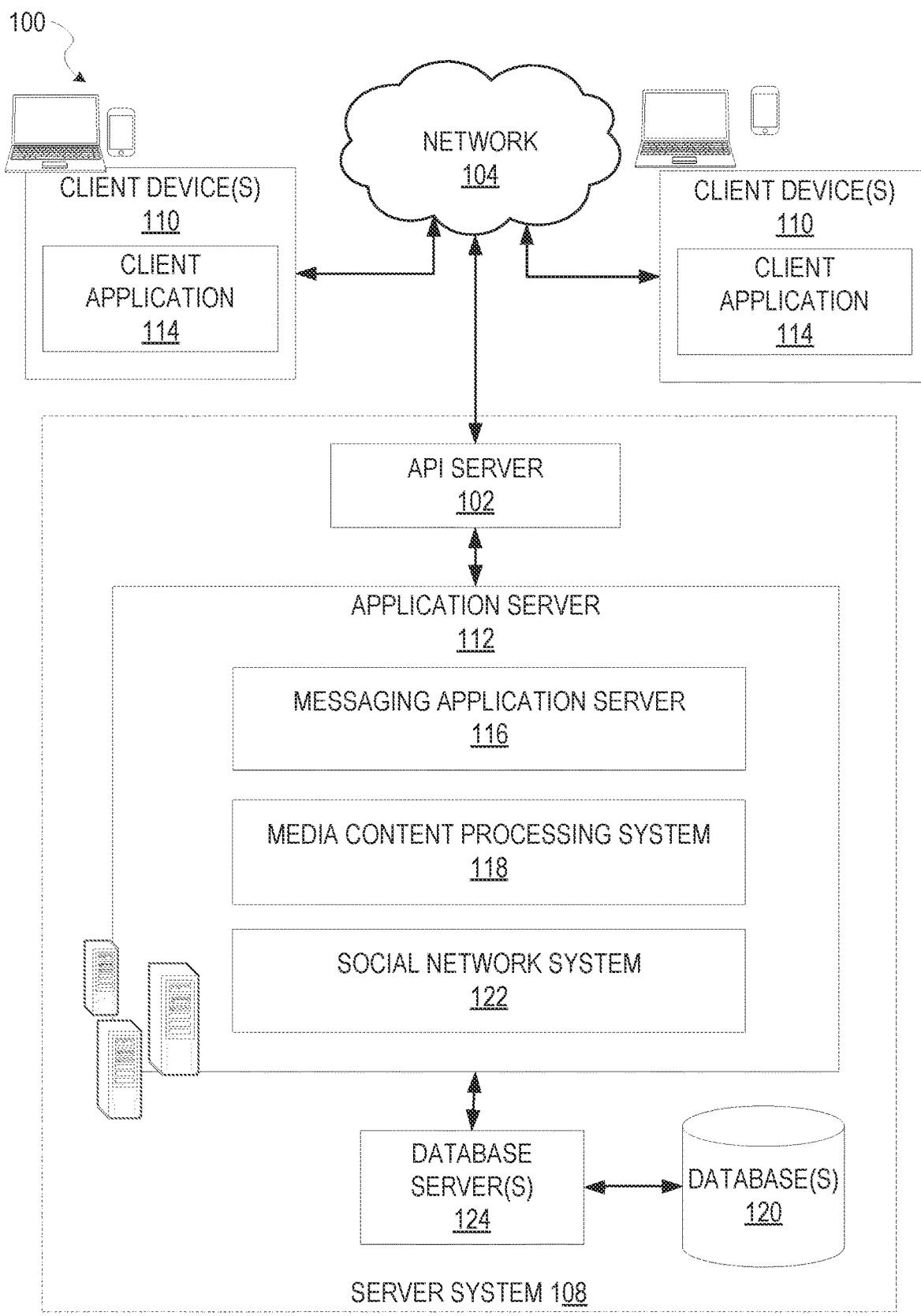
FIG. 1 is a block diagram showing an example messaging system for exchanging data (e.g., messages and associated content) over a network, according to some example embodiments.

Systems and methods described herein relate to generation of media collections in a messaging system. Example embodiments allow users to generate one or more media content items to be included in a media collection. The media collection may be created by the user, other users, or an entity (e.g., associated with a messaging system, an organization, and event, and so forth). Example embodiments further allow users to share the media collection with other users. For example, the user may make some or all of a media collection public such that anyone using the messaging system may view the media collection. Example embodiments further allow users to set access criteria through privacy settings assigned to one or more media content items themselves, as well as to a media collection, such that some or all of the media collection may only be viewed by users authorized by the user sharing the media content item or media collection (e.g., only to one or more users designated by the user as a "friend").

A user of a client device may generate or configure a media content item and in response, a system may present a selection of privacy options that may be assigned to the media content item. For example, the privacy options may comprise a selection of access criteria required to receive access to the media content item. Such access criteria may include geo-location criteria, temporal criteria, as well as user profile information.

The user can then add the media content item to one or more media collections. A media collection (e.g., gallery) may be a collection of photos and videos curated by one or more users, which may be viewed by other users. In some embodiments, in response to generating the media content item, the system may present to the user a set of media collections that the user may add the media content item to. In response to receiving a selection of a media collection from among the set of media collections, the system may add the media content item to a collection of photos or videos associated with the selected media collection, based on the access criteria of the privacy option assigned to the media content item, Thus, two different users that access the same media collection may be presented with different collections of photos or videos (i.e., different portions of the same media collection) based on access criteria assigned to one or more of the media content items that comprise the media collection.

Certain users with prominent public personas may desire to retain a level of privacy in order to continue using a social network platform for personal friends and family (e.g., bidirectional connections). A system to enable such users to set access criteria to portions of a media collections, or specific media content items would therefore be desirable. As an illustrative example, a prominent user with a large following of users may be presented with a set of privacy options in response to generating a media content item. The user may select a privacy option from among the set of privacy options, and in response, a collection management system assigns the selected privacy option to the media content item. The selected privacy option may for example specify that only bidirectional connections (i.e., friends of the user) may receive access to the media content item.

The user may then add the media content item to a new or existing media collection, wherein the media collection comprises a collection of photos and videos curated by the user (or one or more users that include the user). While most of the media collection itself may be accessible to anyone that requests to view the media collection, portions of the media content item itself may be filtered out of the media collection for everyone that does not satisfy the access criteria defined by the privacy option assigned to the media content item. A prominent user can therefore remain active in their own private circle of connections without having to publicly post or share all content.

FIG. 1 is a block diagram illustrating a networked system 100 (e.g., a messaging system) for exchanging data (e.g., messages and associated content) over a network. The networked system 300 includes multiple client devices 110, each of which hosts a number of client applications 114, Each client application 114 is communicatively coupled to other instances of the client application 114 and a server system 308 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via a network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash.) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application that allows a user to take a photograph or video, add a caption or otherwise edit the photograph or video, and then send the photograph or video (e.g., media content item) to another user. The media content item may be sent (e.g., as a message) directly to one or more other users or may be shared with other users via a media collection. For example, the media content item may be added or included in a media collection and then shared with everyone in the messaging system or with only one or more specific users.

In one example, the message (e.g., media content item) may be ephemeral and be removed from a receiving user device after viewing or after a predetermined amount of time (e.g., 10 seconds, 24 hours, etc.), An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a media collection, as explained above. A media collection (e.g., gallery) may be a collection of photos and videos which may be viewed by other users "following" the user's media collection (e.g., subscribed to view and receive updates in the user's media collection). In one example, the media collection may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a media collection that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data e.g., data associated with video and images), computing device context data, privacy setting information, and so forth. The one or more databases 120 may further store information related to third party servers, third party applications, client devices 110, client applications 114, users, and so forth.

The one or more database(s) 120 may include cloud-based storage external to the server system 308 (e.g., hosted by one or more third-party entities external to the server system 308). While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third party server(s), may interact with the server system 108 via API server 102 via a programmatic interface provided by the API server 102. For example, one or more of the third party applications may request and utilize information from the server system 108 via the API server 102 to support one or more features or functions on a website hosted by the third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 100 are invoked and controlled through functions available via user interfaces (UIs) of the client application 114.

In the server system 108, the API server 110 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of a list of friends of a user of a client device 110; the retrieval of such collections; the retrieval of messages and content; the adding of friends to and deletion of friends from a social graph; the location of friends within a social graph; opening an application event (e.g., relating to the client application 114); the retrieval of privacy setting associated with a media content item or media collection, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
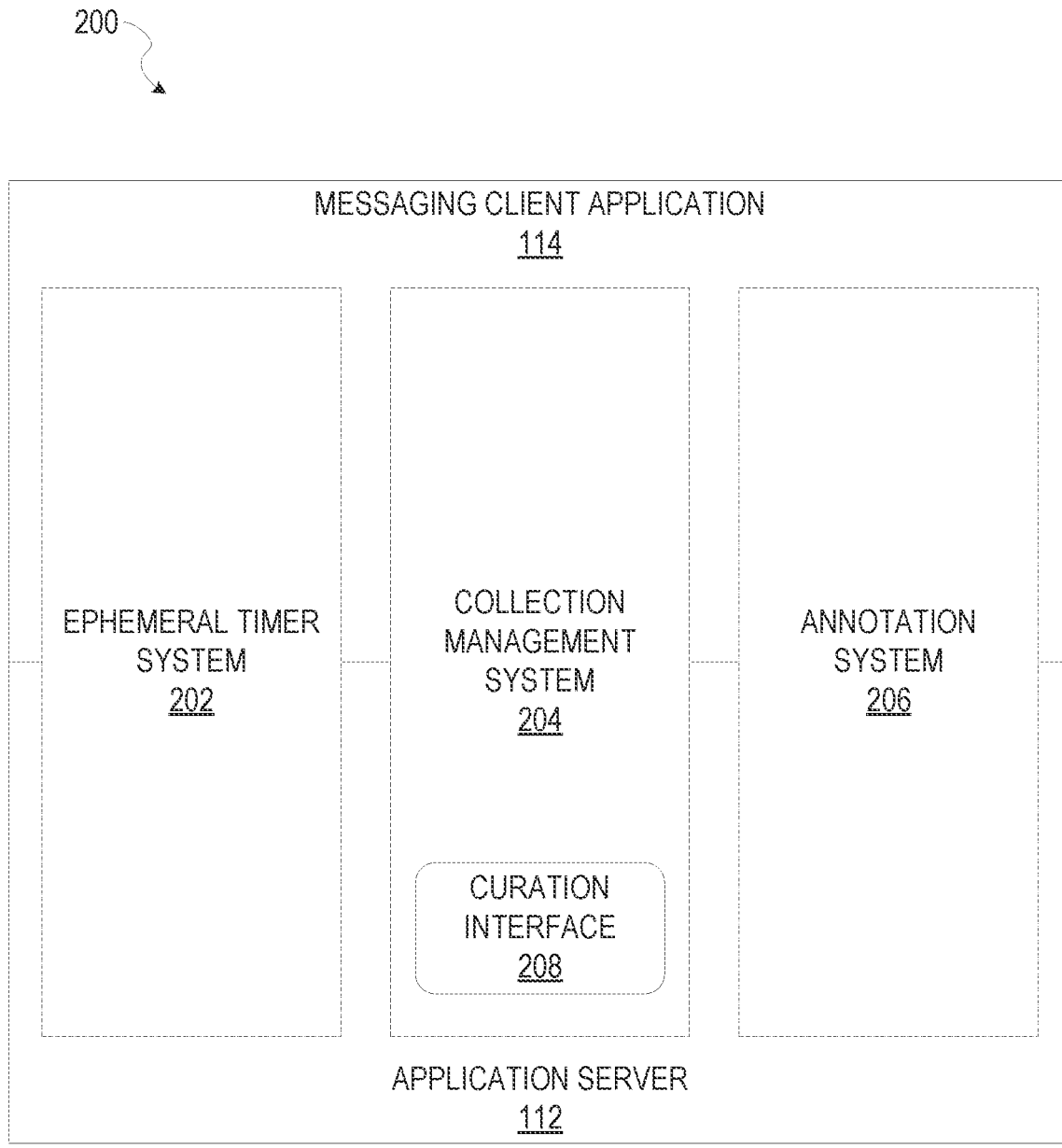
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 2406 associates the media overlay of a highest bidding merchant with a corresponding geolocation for a predefined amount of time.

Figure 3:
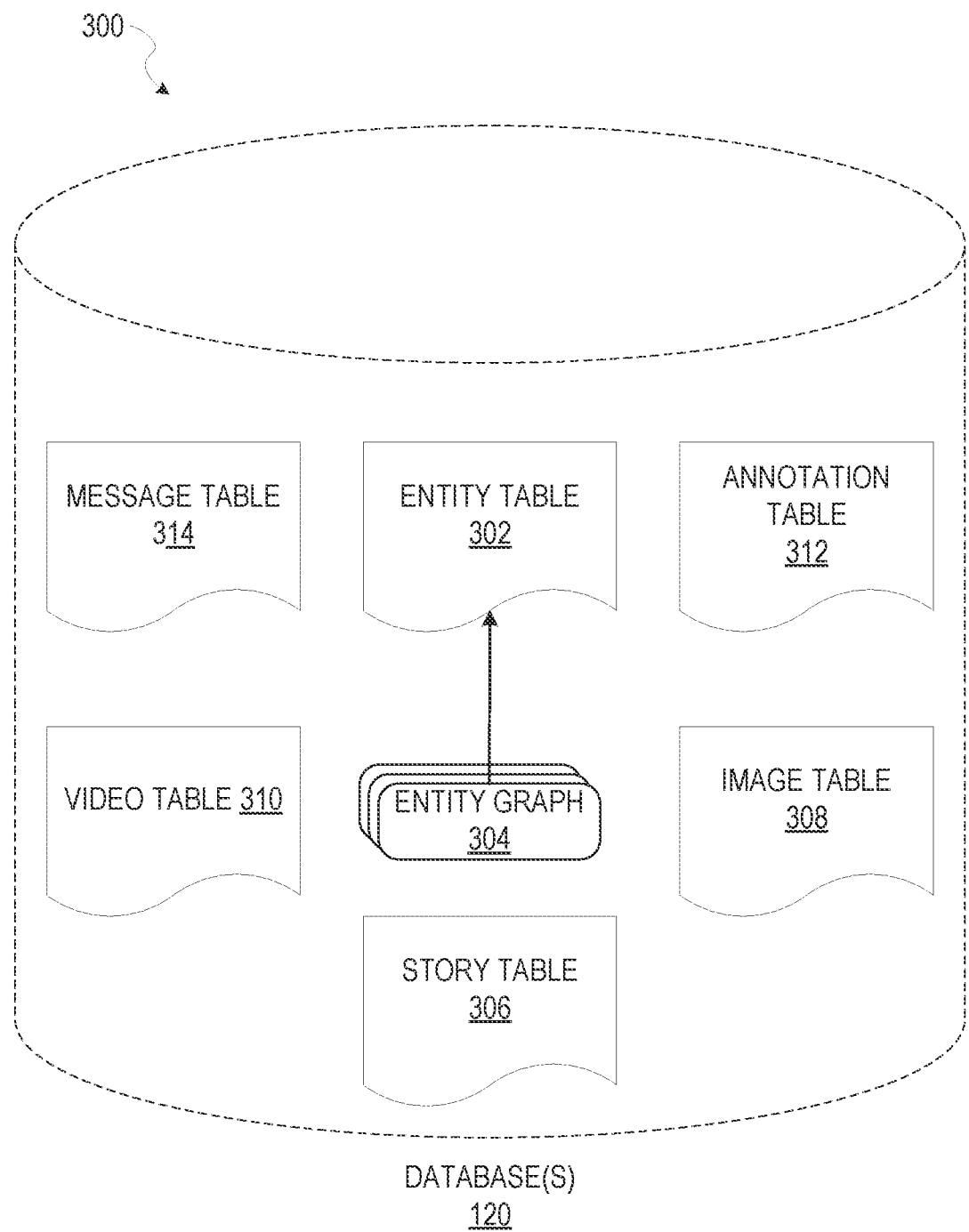
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a UPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a. particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a. particular collection. In some embodiments, a contribution to a location story may require a second degree of authentication to verify that the end user belongs to a specific organization or other entity (e.g., is a student on the university campus).

Figure 4:
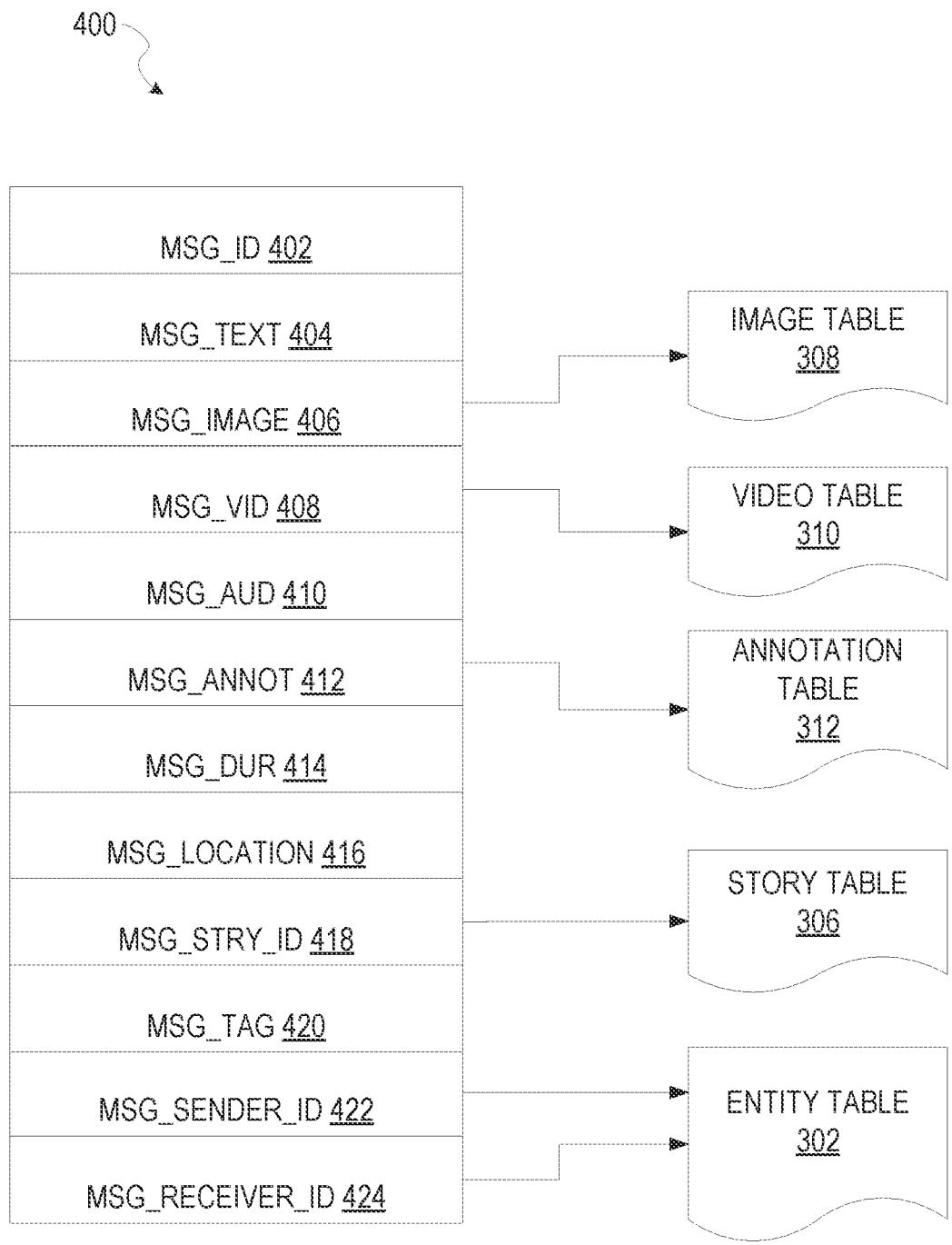
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116 Similarly, the content of a message 300 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

A message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values, A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422. and the message receiver identifier 424 may point to user records stored within an entity table 302.

As described above, example embodiments allow users to generate one or more media content items to be included in a media collection. The media collection may be created by the user, other users, or an entity (e.g., associated with a messaging system, an organization, and event, and so forth). Example embodiments further allow users to share the media collection with other users. For example, the user may make the media collection public such that anyone using the messaging system may view the media collection. Example embodiments further allow users to set privacy settings such that the media collection may only be viewed by users authorized by the user sharing the media collection e.g, only to one or more users designated by the user as a "friend").

Figure 5:
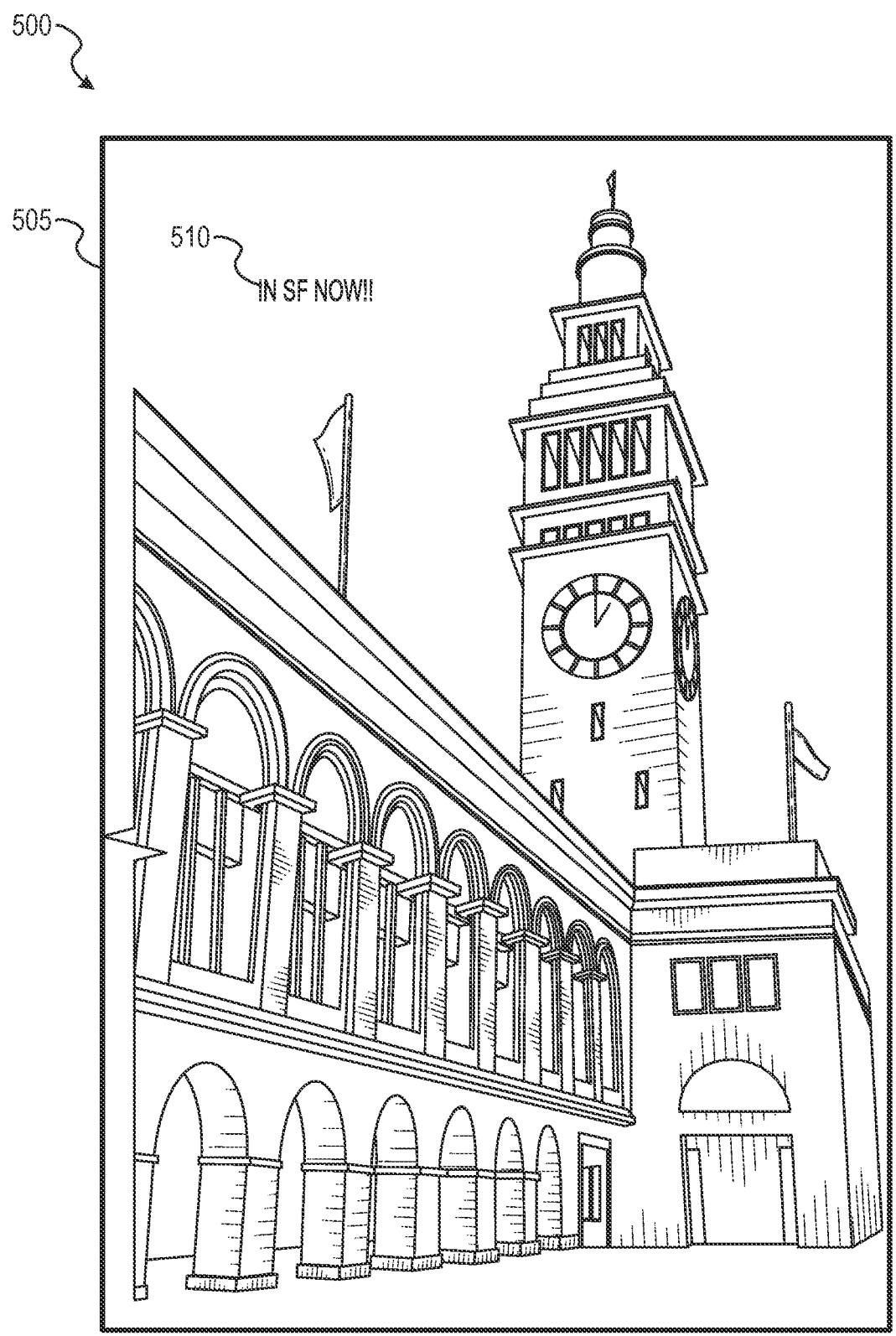
FIG. 5 illustrates an example media content item, according to some example embodiments.

For example, a user may capture an image or video on a computing device (e.g., client device 110). The user may further user creative tools to edit the image or video (e.g., to add text, audio, media overlays, etc.). FIG. 5 illustrates an example of a media content item 500 comprising an image 505 captured by a user and text 510 (i.e., "In SF now!!") added to the image 505. The computing device generates the media content item 500 based on the image or video 505 captured by the user and any creative tools used to edit the captured image or video 505.

The user may want to send the media content item 500 (e.g., as a message) to one or more other users directly, or add the media content item 500 to an existing media collection or create a new media collection for the media content item. The user may indicate that he wishes to send the media content item 500 and/or add the media content item 500 to the media collection by interacting (e.g., via touch screen, mouse, pointing device, etc.) a menu item or button on a graphical user interface displayed on a display of the computing device, via a button or other mechanism of the computing device, or other means.

Figure 6:
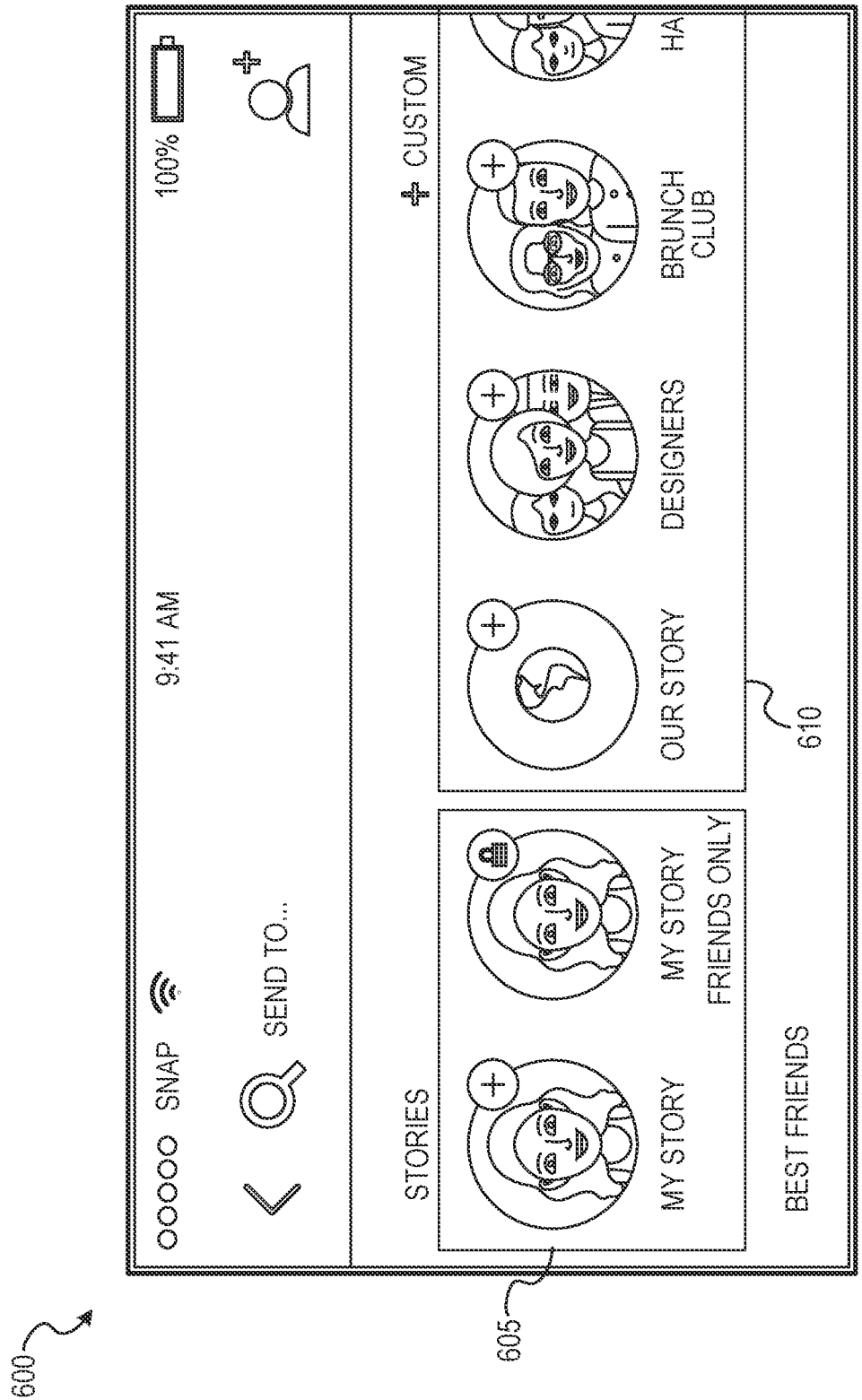
FIG. 6 illustrates an example graphical user interface to display privacy options, according to some example embodiments.

The computing device receives the indication from the user to include the media content item 500 in a media collection and FIG. 6 illustrates an example graphical user interface 600 to display privacy options 605 that may be assigned to the media content item 505 that may be displayed by the computing device to the user to select users or media collections 610 (e.g., "Stories") to which to send or post the media content item.

Example embodiments include privacy options allow the user to specify whether he would like to add the media content item to a media collection that is available to everyone (e.g., everyone in the messaging system or everyone that has subscribed to the media collection to view the media collection and any updates to the media collection) or to add the media content item to a media collection that is only available to specific or authorized users (e.g., users designated as a "friend"). The computing device may provide the plurality of selections for privacy options for the media collection to the user. For example, the computing device may display the GUI 600 shown in FIG. 6 so that a user may select "My Story" to add the media content item to a new or existing media collection that may be viewed by everyone, or select "My Story Friends Only" to add the media content item to a new or existing media collection that may only be viewed by specific or authorized users (e.g., users authorized by the user to view the media collection).

The user may select the privacy option for the media collection via the GUI 600 or other means and upon receiving the selection, the computing device adds the media content item to the media collection according to the selection of privacy options by the user. In this way, the computing device causes the media collection to be accessible by one or more computing devices associated with other users according to a privacy policy associate with the selection of the one of the privacy options for the media collections.

For example, if the user selects the "My Story Friends Only" option in the GUI 600, the computing device causes the media content item to be posted to this media collection and only the user's friends will be able to view this media collection. if the user selects "My Story" option in the GUI 600, the computing device causes the media content item to be posted to the media collection and everyone will be able to view this media collection. In one example embodiment, a user may only be able to select either "My Story" or "My Story Friends Only" and not both. For example, if the user selects first one and then taps the other, the first one will become un-selected.

Either a new media collection may be created for the media content item or the media content item may be added to an existing media collection. The existing media collection comprises a plurality of media content items created by the user.

Example embodiments allow users, such as influencers and celebrities, to use the messaging system with their closest fends while also trying to amass a following. Thus, example embodiments do not force a user to choose between building a following and being their true self. Also, this allows users such as celebrities to continue to add to media collections shared with their closest friends. Friends (or specific or authorized users) may be users connected with a bidirectional friendship. Example embodiments allow a user the option to send a media content item to a media collection for fiends only (e.g., bidirectional relationship), select friends, or everyone (e.g., everyone in the messaging system)

Example embodiments allow for de-duplication of media content items even if the media content items are sent to both a friends only media collection and an everyone media collection. For example, a user may send a media content item to a friends only media collection and then later send the same media content item to an everyone story, but the view of the media collection would only show the media content item to a user once.

Example embodiments allow a user to create a custom group of users to which to share media collections, other than just a friends only media collection and an everyone media collection. Moreover, a user may set a global setting in the messaging application/system for sharing media collections to be shared with everyone. Even though such a setting has been set by a user, the setting may be overridden if the user selects to add the media content item to a friends only media collection.

Figure 7:
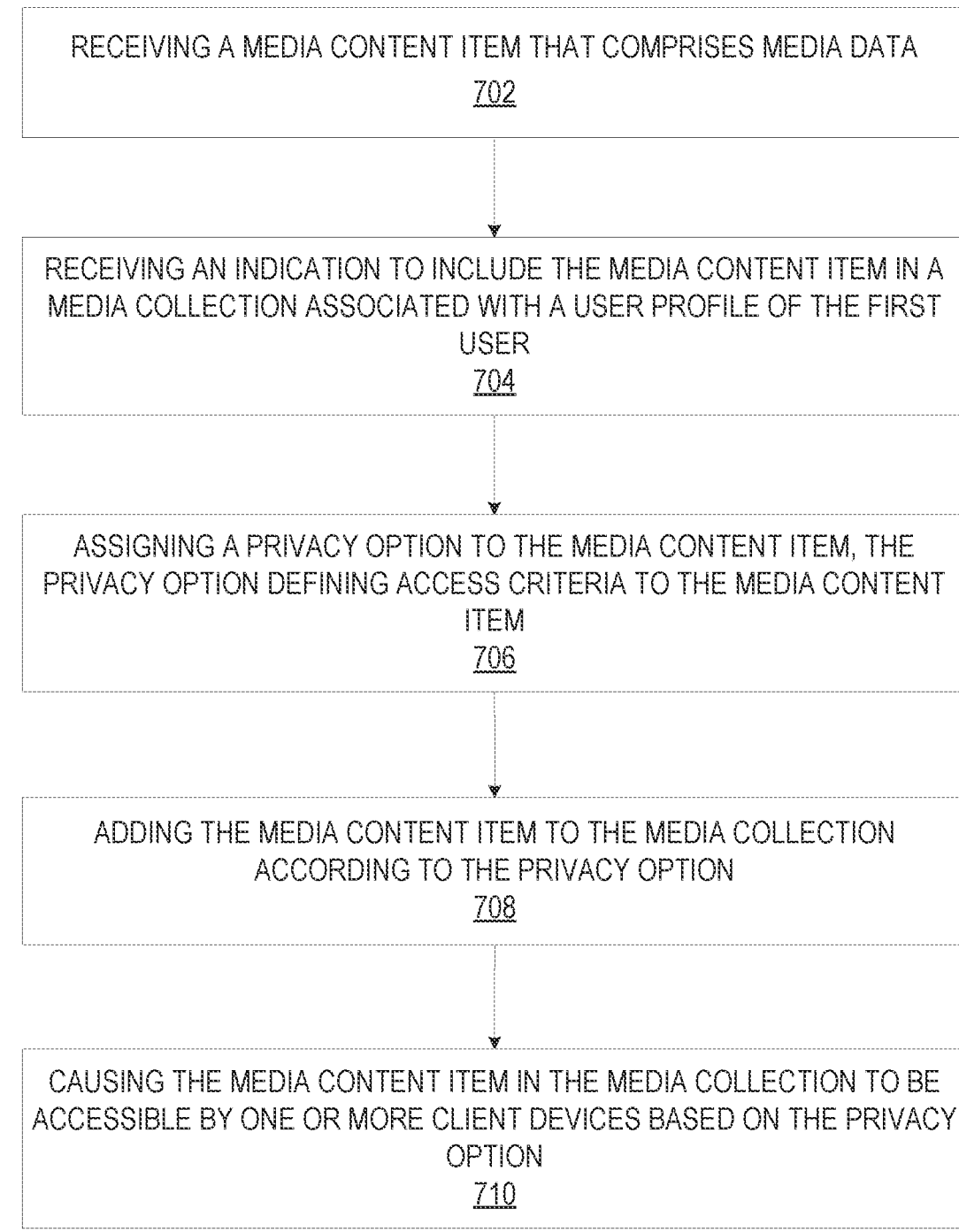
FIG. 7 is a flowchart illustrating a method for assigning privacy options to a media content item, according to certain example embodiments.

FIG. 7 is a flowchart illustrating a method 700 for assigning privacy options to a media content item, according to certain example embodiments. Operations of the method 700 may be performed by the collection management system 204 as seen in FIG. 2. As shown in FIG. 7, the method 700 includes one or more operations 702, 704, 706, 708 and 710.

At operation 702, the collection management system 204 receives a media content item that comprises media data, such as the media content item 500 of FIG. 5. For example, a user of a client device 110 may generate and edit the media content item 500, or access and retrieve the media content item 500 from a third party source.

At operation 704, the collection management system 204 receives an indication to include the media content item (e.g., the media content item 500) in a media collection associated with a user (e.g., a user of the client device 110). For example, in response to generating the media content item 500, the user may be presented with an option to include the media content item in a new or existing media collection.

At operation 706, the collection management system 204 assigns a. privacy option to the media content item, wherein the privacy option defines access criteria required to view or otherwise access to the media content item. The access criteria may for example include geo-location criteria, temporal criteria, as well as user profile information. For example, a privacy option may restrict access to a media content item to friends (or specific or authorized users) with a bidirectional friendship to the user.

At operation 708, the collection management system 204 adds the media content item to a media collection according to the privacy option assigned to the media content item.

At operation 710, the collection management system 204 causes the media content item in the media collection to be accessible by one or more client devices based on the privacy option. For example, in some embodiments, in response to adding the media content item to the media collection according to the privacy option assigned to the media content item, the collection management system 204 may cause the social network system 122. to present a notification at one or more client devices that have access to the media content item based on the privacy option.

FIG. 8 is a flowchart illustrating a method 800 for assigning privacy options to a media content item, according to certain example embodiments. Operations of the method 800 may be performed by the collection management system 204 as a precursor or subroutine of operation 704 and 706 of the method 700 of FIG. 7. As shown in FIG. 8, the method 800 includes one or more operations 802, 804, and 806.

At operation 802, the collection management system 204 causes display of a plurality of privacy options at the client device 110 in response to receiving the indication to include the media content item in the media collection associated with the user profile, as in operation 704 of the method 700. For example, FIG. 6 provides an illustration of a GUI 600 that includes privacy options 605.

At operation 804, the collection management system 204 receives a selection of a privacy option to be assigned to the media content item from among the plurality of privacy options. In response to receiving the selection of the privacy options from among the plurality of privacy options, at operation 806 the collection management system 204 assigns the privacy option to the media content item.

FIG. 9 is a flowchart illustrating a method 900 for assigning privacy options to a media content item, according to certain example embodiments. Operations of the method 900 may be performed by the collection management system 204 as seen in FIG. 2. As shown in FIG. 9, the method 900 includes one or more operations 902, 904, and 906.

At operation 902, the collection management system 204 receives a request to display the media collection from a second client device 110, wherein the request includes at least a request attribute. For example, the request attribute may be geo-location data, temporal data, or user profile information.

At operation 904, the collection management system 204 filters the media content item from the media collection based on the request attribute and the access criteria of the privacy option assigned to the media content item.

At operation 906, the collection management system 204 presents the filtered media collection at the second client device 110.

Figure 10:
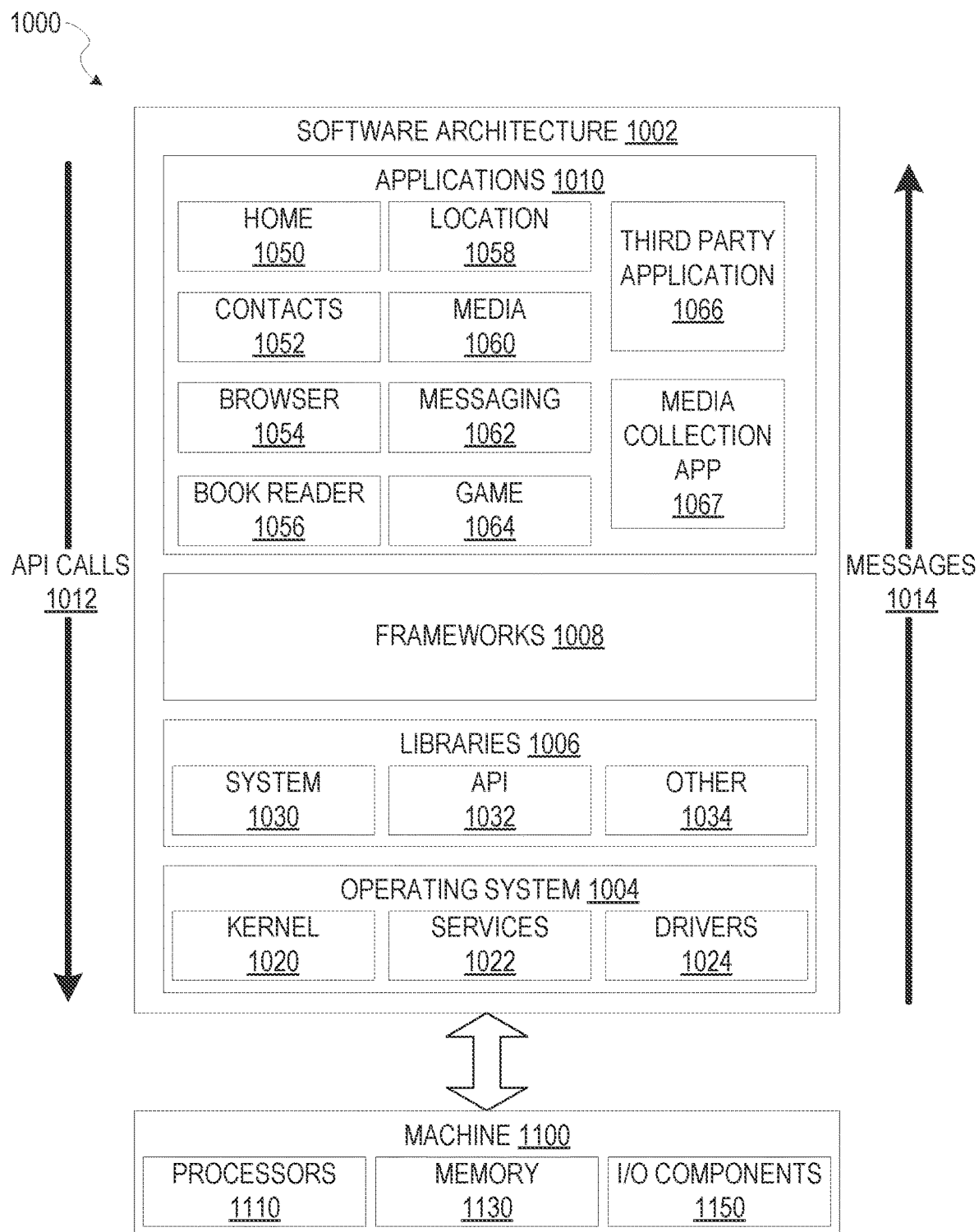
FIG. 10 is a block diagram illustrating an example of a software architecture that may be installed on a machine, according to some example embodiments.

FIG. 10 is a block diagram 1000 illustrating a software architecture 1002, which can be installed on any one or more of the devices described above. For example, in various embodiments, client devices 110, server systems 102, 112, 116, 118, 122, and 124 may be implemented using some or all of the elements of the software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IDS™, ANDROID™, WINDOWS® Phone, or another mobile operating system. In this example, the third party application 1066 can invoke the API calls 1012 provided by the operating system 1004 to facilitate functionality described herein.

Some embodiments may particularly include a media collection generation application 1067. In certain embodiments, this may be a. standalone application that operates to manage communications with a server system such as third party servers or server system 108. In other embodiments, this functionality may be integrated media collection generation application 1067 may request and display various data related to messaging, media content, media collections, media overlays, and so forth, and may provide the capability for a user 106 to input data related to the system via a touch interface, keyboard, or using a camera device of machine 1100, communication with a. server system via. I/O components 1150, and receipt and storage of object data in memory 1130. Presentation of information and user inputs associated with the information may be managed by the media collection generation application 1067 using different frameworks 1008, library 1006 elements, or operating system 1004 elements operating on a machine 1100.

Figure 11:
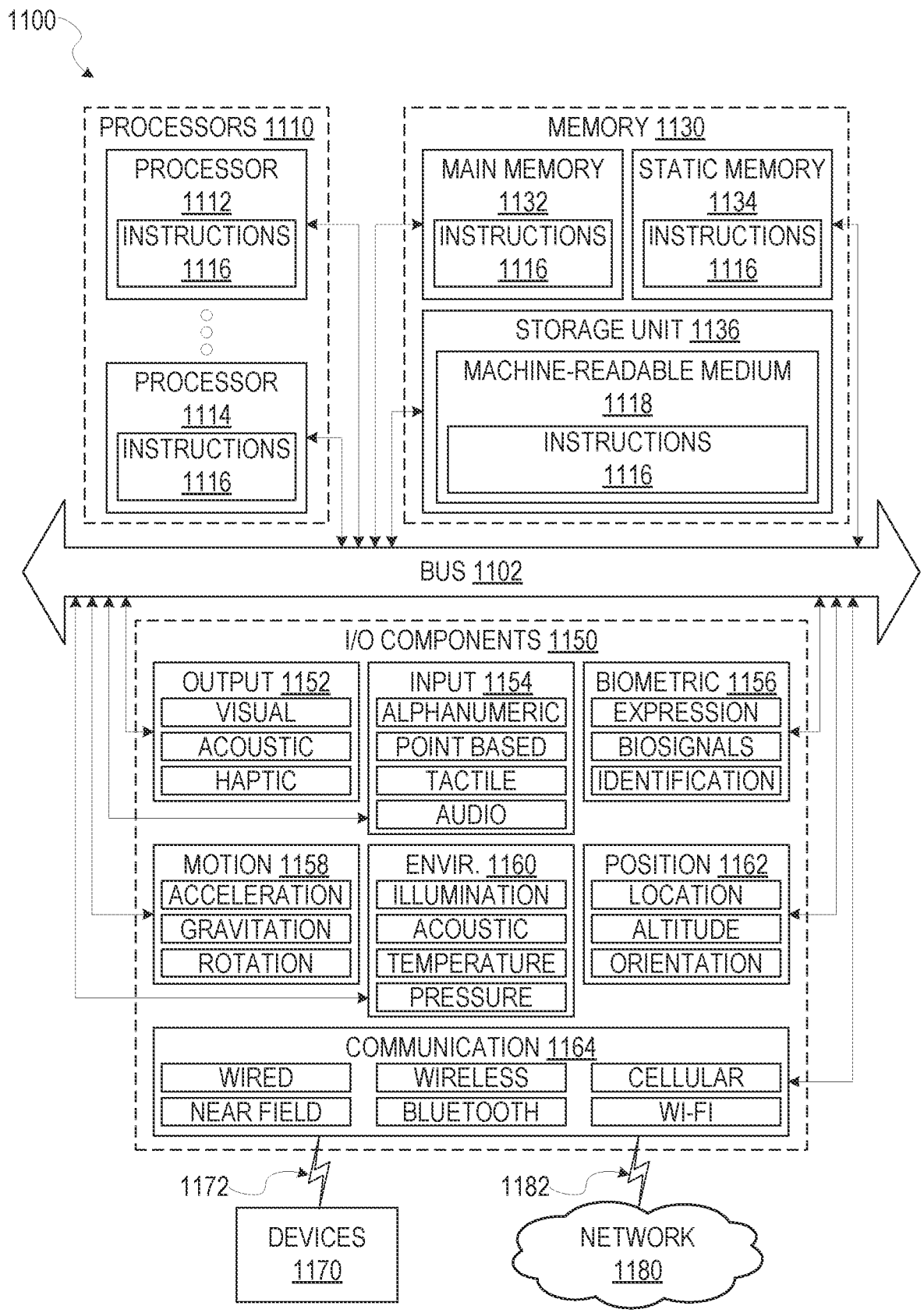
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine 102, 112, 116, 118, 122, 124, and the like, or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1118 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1118.

As used herein, the term "memory" refers to a machine-readable medium 1118 able to store data temporarily or permanently and may be taken to include, but not be limited to, random-access memory (RAM), read-only memory (ROM), buffer memory, flash memory, and cache memory. While the machine-readable medium 1118 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), Wi-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in sonic embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1118 is non-transitory (in other words, not having any transitory signals) in that it does not embody a propagating signal. However, labeling the machine-readable medium 1118 "non-transitory" should not be construed to mean that the medium is incapable of movement; the medium 1118 should be considered as being transportable from one physical location to another. Additionally, since the machine-readable medium 1138 is tangible, the machine-readable medium 1118 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to he taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving a media item from a first user account;
assigning an access criteria to the media item, the access criteria including a temporal criteria that comprises a period of time;
allocating the media item to a first media collection and a second media collection associated with the first user account based on the access criteria;
receiving a request to access the first media collection and the second media collection from a second user account during the period of time associated with the temporal criteria;
generating a presentation of a story that comprises the first media collection and the second media collection in response to the request during the period of time associated with the temporal criteria;
determining that the presentation of the story that comprises first media collection and the second media collection comprises a duplicate display of the media item; and
filtering the duplicate display of the media item from the presentation of the story.

2. The method of claim 1, wherein the media content item comprises one or more of the list comprising:
video data;
a media overlay;
audio data; and
image data.

3. The method of claim 1, wherein the first media collection corresponds with a first access criteria and the second media collection corresponds with a second access criteria.

4. The method of claim 3, wherein the first access criteria and the second access criteria comprise one or more of:
a geo-location criteria; and
user profile information.

5. The method of claim 1, wherein the media item comprises an ephemeral media item.

6. The method of claim 1, wherein the first media collection corresponds with a first identifier, the second media collection corresponds with a second identifier, and the allocating the media item to the first media collection and the second media collection further comprises:
receiving an input that selects the first identifier and the second identifier; and
allocating the media item to the first media collection and the second media collection based on the input.

7. A system comprising:
one or more hardware processors; and
a computer-readable medium coupled with the one or more hardware processors, the computer-readable medium comprising instructions stored thereon that are executable by the one or more hardware processors to cause the computing device to perform operations comprising:
receiving a media item from a first user account;
assigning an access criteria to the media item, the access criteria including a temporal criteria that comprises a period of time;
allocating the media item to a first media collection and a second media collection associated with the first user account based on the access criteria;
receiving a request to access the first media collection and the second media collection from a second user account during the period of time associated with the temporal criteria;
generating a presentation of a story that comprises the first media collection and the second media collection in response to the request during the period of time associated with the temporal criteria;
determining that the presentation of the story that comprises first media collection and the second media collection comprises a duplicate display of the media item; and
filtering the duplicate display of the media item from the presentation of the story.

8. The system of claim 7, wherein the media content item comprises one or more of the list comprising:
video data;
a media overlay;
audio data; and
image data.

9. The system of claim 7, wherein the first media collection corresponds with a first access criteria and the second media collection corresponds with a second access criteria.

10. The system of claim 9, wherein the first access criteria and the second access criteria comprise one or more of:
a geo-location criteria; and
user profile information.

11. The system of claim 7, wherein the media item comprises an ephemeral media item.

12. The system of claim 7, wherein the first media collection corresponds with a first identifier, the second media collection corresponds with a second identifier, and the allocating the media item to the first media collection and the second media collection further comprises:
receiving an input that selects the first identifier and the second identifier; and
allocating the media item to the first media collection and the second media collection based on the input.

13. A non-transitory computer-readable medium comprising instructions stored thereon that are executable by at least one processor to cause a computing device to perform operations comprising:
receiving a media item from a first user account;
assigning an access criteria to the media item, the access criteria including a temporal criteria that comprises a period of time;
allocating the media item to a first media collection and a second media collection associated with the first user account based on the access criteria;
receiving a request to access the first media collection and the second media collection from a second user account during the period of time associated with the temporal criteria;
generating a presentation of a story that comprises the first media collection and the second media collection in response to the request during the period of time associated with the temporal criteria;
determining that the presentation of the story that comprises first media collection and the second media collection comprises a duplicate display of the media item; and
filtering the duplicate display of the media item from the presentation of the story.

14. The non-transitory computer-readable medium of claim 13, wherein the media content item comprises one or more of the list comprising:
video data;
a media overlay;
audio data; and
image data.

15. The non-transitory computer-readable medium of claim 13, wherein the first media collection corresponds with a first access criteria and the second media collection corresponds with a second access criteria.

16. The non-transitory computer-readable medium of claim 15, wherein the first access criteria and the second access criteria comprise one or more of:
   a geo-location criteria; and
   user profile information.

17. The non-transitory computer-readable medium of claim 13, wherein the first media collection corresponds with a first identifier, the second media collection corresponds with a second identifier, and the allocating the media item to the first media collection and the second media collection further comprises:
   receiving an input that selects the first identifier and the second identifier; and
   allocating the media item to the first media collection and the second media collection based on the input.

* * * * *